Nov. 17, 1970 G. M. YAZIGI 3,541,255

TV SCREEN ALIGNMENT DEVICE

Filed July 13, 1967 2 Sheets-Sheet 1

George M. Yazigi

INVENTOR.

BY Clarence A. O'Brien and Harvey B. Jacobson

Attorneys

TV SCREEN ALIGNMENT DEVICE

Filed July 13, 1967 2 Sheets-Sheet 2

George M. Yazigi
INVENTOR.

BY Clarence A. O'Brien
and Harvey B. Jacobson
Attorneys

United States Patent Office 3,541,255

Patented Nov. 17, 1970

3,541,255

TV SCREEN ALIGNMENT DEVICE

George M. Yazigi, 2060 Sutterville Road, Sacramento, Calif. 95822

Filed July 13, 1967, Ser. No. 653,192

Int. Cl. H01j 29/02

U.S. Cl. 178—7.8 14 Claims

ABSTRACT OF THE DISCLOSURE

A device for centrally aligning the test pattern image on a television screen. A locator body provided with suction cup, supports an assembly of extensible arms on the vertical surface of a television picture tube. The arms extend to the visible edges of the picture tube screen for centrally positioning the locator body thereon.

This invention relates to a locator device especially designed for alignment of the test pattern image on the viewing screen of a television picture tube.

The present invention deals with the problem of properly aligning images on a television screen by locating the center thereof directly on the surface of the television picture tube. Precise alignment of the test pattern image may be achieved by using a simple and economically fabricated device that is easily applied to and removed from the picture tube.

The locator device of the present invention is especially designed for the vertical surface of a television picture tube by supporting an assembly of extensive arms on a vertical surface. The arms when aligned with the upper and lower and side edges of the picture tube exposed through the opening in a television receiver cabinet, will position the locator body from which the arms extend in a simple yet rapid and precise manner.

In accordance with the present invention, the alignment device includes a central locator body from which the arms extend, the arms being extensible by incremental amounts in order to accommodate picture tubes of different sizes. Further, the locator body is removably supported on the vertical surface of the picture tube by means of a suction cup when the locator body is centrally positioned. The arms may also be angularly displaced relative to each other from positions extending at 90° to each other to radially aligned positions for storage purposes. Spring detents are utilized to yieldably hold the arms in their operative and storage positions. Other spring detents are also utilized to hold the arms extended by fixed amounts in order to accommodate picture tubes of different sizes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 2, 3:
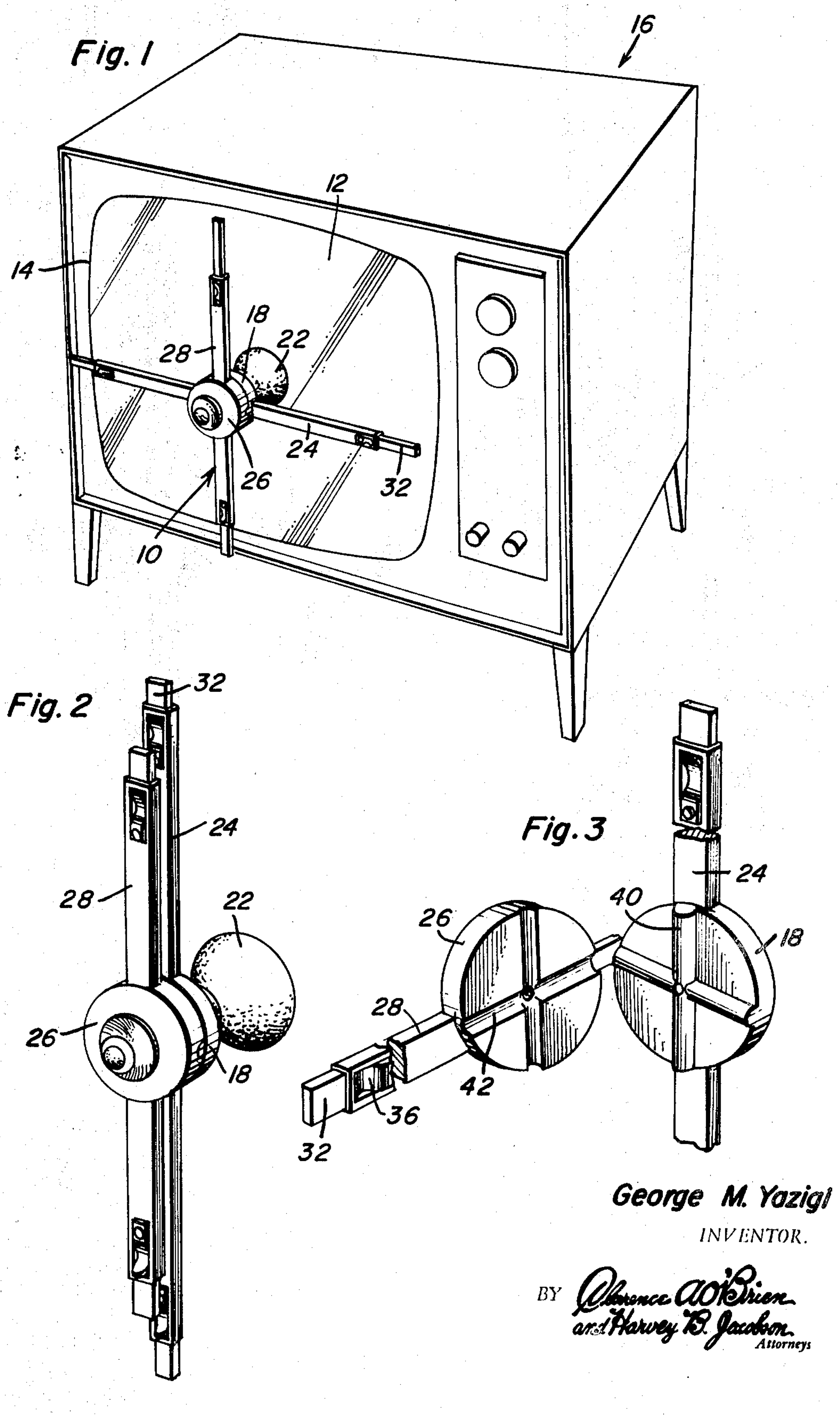
FIG. 1 is a perspective view showing the alignment device of the present invention in use on the picture tube of a television receiver.
FIG. 2 is a perspective view showing the alignment device in a storage condition.
FIG. 3 is a perspective view showing disassembled parts of the alignment device.

Referring now to the drawings in detail, it will be observed from FIG. 1 that the alignment device generally referred to by reference numeral 10 is supported on the viewing screen surface 12 of a television picture tube exposed through the generally rectangular opening 14 in the cabinet of the television receiver 16. When so positioned on the screen surface, the alignment device 10 will permit the television technician to properly gauge alignment of the test pattern image on the screen of the picture tube effected by well known procedures.

Figure 4:
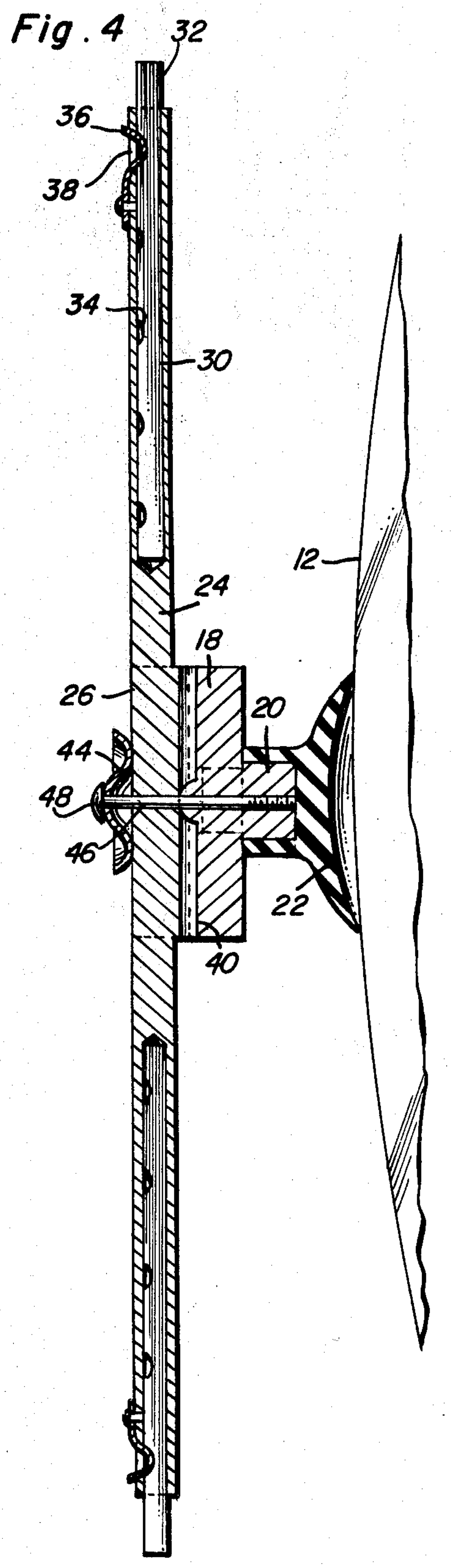
FIG. 4 is a longitudinal sectional view through the alignment device.

The alignment device includes a circular disk body 18 having a central axial projection 20 received within the socket of a suction cup 22 by means of which the alignment device is adapted to be removably supported by adhesion on the screen surface 12 as more clearly seen in FIG. 4.

Extending radially from the circular locator body 18 in 180° relation to each other, are a pair of arms 24 of fixed lengths. Mounted on the body 18 by means of a circular block 26, are a second pair of arms 28 of fixed length. The arms 28 are also disposed in 180° relation to each other on the block 26 and are shorter in length than the arms 24 since they are designed to extend toward the vertically spaced horizontal edges of the screen surface whereas the longer arms 24 extend toward the horizontally spaced vertical edges of the screen surface. By aligning the radially outer ends of the arms 24 and 28 with these edges, the locator body 18 will be centrally positioned on the surface 12. The body may then be pressed inwardly against the surface so as to obtain adhesion at the suction cup 22.

Figure 5:
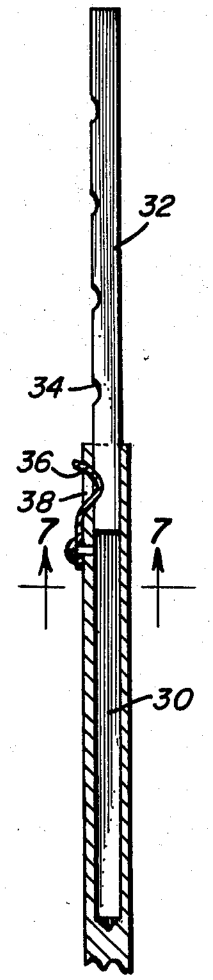
FIG. 5 is a partial sectional view showing an arm of the alignment device in an extended condition.
Figure 6:
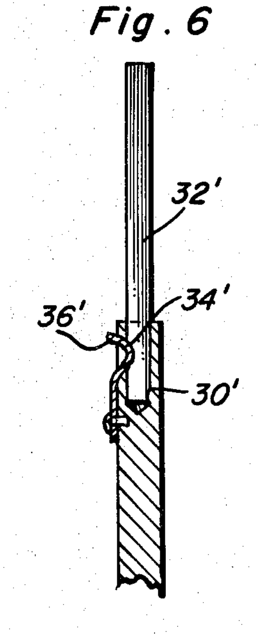
FIG. 6 is a partial sectional view showing one modification of the alignment device.
Figure 7:
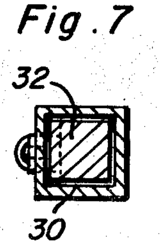
FIG. 7 is a transverse sectional view taken substantially through a plane indicated by section line 7—7 in FIG. 5.

Each of the arms 24 and 28 are similar in construction and as more clearly seen in FIGS. 4, 5 and 7 are provided with noncircular sockets 30 within which extension rods 32 are slidably mounted. The extension rods are provided with longitudinally spaced notches 34 adapted to receive the spring detents 36 that are mounted on the arms adjacent the radial ends from which the extension rods project. Openings 38 are accordingly formed in the socket portions of the arms so that the spring detents 36 may project therethrough into the notches 34 in order to hold the extension rods in an adjusted position. It will be apparent therefore, that the arms may be extended by incremental amounts in order to accommodate picture tubes of different sizes. Alternatively, the arms may be provided with relatively short sockets 30' as shown in FIG. 6 into which replaceable extension rods 32' of different lengths may be inserted having a single notch 34' adapted to receive a spring detent 36' as shown in FIG. 6 for holding the extension rod 32' in position. Standard length extension rods 32' may therefore be provided and inserted into the sockets 30' in accordance with the size of the picture tube on which the alignment device is to be positioned.

As more clearly seen in FIGS. 3 and 4, the locator body 18 is provided with a pair of diametrical projections 40 extending 90° to each other and adapted to be received within the diametrical grooves 42 formed in the confronting face of the block 26. The blocks are yieldably held in axially assembled relation with the projections 40 seated in the grooves 42 by means of a spring detent element 44 which bears against the block 46. The spring detent element 44 is mounted on the shank 46 of a bolt member beneath its head 48, the threaded end of the shank being threadedly received within the locator body 18. It will be apparent therefore, that the shorter pair of arms 28 may be angularly displaced against the bias of the spring detent element 44 from an operative position as illustrated in FIG. 1 to a storage position as shown in FIG. 2 wherein both pairs of arms are disposed in radial alignment with each other.

In order to use the alignment device, the arms 24 and 28 which are preferably made of a fixed length adapted to accommodate the smallest size picture tubes are extended if necessary by means of the extension rod 32 to the proper length. The device may then be placed on the surface 12 with the ends of the longer arms 24 aligned with the edges of the picture tube. The shorter arms 28 may then be rotated to their operative position spaced 90° from the longer arms 24 and the ends thereof aligned with the upper and lower edges of the picture tube. The assembly may then be pushed inwardly in order to cause the suction cup 22 to adhere to the surface 12. The locator body 18 will then be centrally positioned on the picture tube surface so that alignment of the test pattern image may be gauged.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A device for centrally aligning an image on a television screen comprising a locator body, removable adhesion means mounted on said body for support thereof on a vertical surface in central alignment with said screen, a first pair of arms extending radially from said body, a second pair of arms and means for mounting said second pair of arms on the body in angularly adjusted positions relative to said first pair of arms.

2. A device for centrally aligning an image on a television screen comprising a locator body, removable adhesion means mounted on said body for support thereof on a vertical surface, a pair of equal length arms extending from said body in 180° relation to each other, a second pair of equal length arms disposed in 180° relation to each other and means for mounting said second pair of arms on the body perpendicular to said first pair of arms, said mounting means for the second pair of arms comprising a mounting block rotatably mounted on said body carrying the second pair of arms and means yieldably holding the block in storage and operative positions on the body with the pairs of arms radially aligned and at right angles to each other respectively.

3. The combination of claim 2 wherein said first pair of arms are longer than said second pair of arms.

4. The combinationof claim 3 including extension means connected to each of said arms for incrementally increasing the length thereof.

5. The combination of claim 4 wherein said extension means includes a non-circular socket formed in each of said arms at ends remote from the body, extension rods slidably received in each of said sockets and detent means mounted on the arms adjacent said ends for engagement with notches formed in said extension rods.

6. The combination of claim 5 wherein said yieldable holding means comprises cooperating diametrical projections and grooves on the body and the block, and spring means yieldably resisting angular displacement of the projections from the grooves in said storage and operative positions of the block on the body.

7. The combination of claim 6 wherein said removable adhesion means is a suction cup.

8. The combination of claim 2 including extension means connected to each of said arms for incrementally increasing the length thereof.

9. The combination of claim 8 wherein said removable adhesion means is a suction cup.

10. The combination of claim 2 wherein said yieldable holding means comprises cooperating diametrical projections and grooves on the body and the block, and spring means yieldably resisting angular displacement of the projections from the grooves in said storage and operative positions of the block on the body.

11. The combination of claim 2 wherein each of said arms is formed with non-circular sockets at ends remote from the body, extension rods slidably received in each of said sockets and detent means mounted by the arms adjacent said ends for engagement with notches formed in said extension rods.

12. The combination of claim 11 wherein said removable adhesion means is a suction cup.

13. The combination of claim 1 wherein said removable adhesion means is a suction cup axially aligned with the locator body.

14. A device for centrally aligning an image on a television screen comprising a locator body, removable adhesion means mounted on said body for support thereof on a vertical surface in central alignment with said screen, a first pair of arms extending radially from said body, a second pair of arms and means for mounting said second pair of arms on the body in angularly adjusted positions relative to said first pair of arms, said mounting means for the second pair of arms comprising a mounting block rotatably mounted on said body carrying the second pair of arms, and means yieldably holding the block in said angularly adjusted positions.

References Cited

UNITED STATES PATENTS

| | | | |
|---|---|---|---|
| 2,446,674 | 8/1948 | Sproul | 178—7.84 |
| 2,648,724 | 8/1953 | Enslein | 178—6 |
| 2,963,652 | 12/1960 | Taylor et al. | 178—6 |
| 2,696,610 | 12/1954 | Turley | 178—7.83 |
| 3,014,724 | 12/1961 | Cryder et al. | 178—7.83 |
| 3,172,039 | 3/1965 | Bernstein | 178—6 |
| 3,401,331 | 9/1968 | Mussulman | 178—6 |

RICHARD MURRAY, Primary Examiner.

D. E. STOUT, Assistant Examiner.

U.S. Cl. X.R.

178—7.83